D. VANCE.
BOLT AND NUT RETAINING MEANS.
APPLICATION FILED SEPT. 18, 1911.
1,064,792.                                       Patented June 17, 1913.
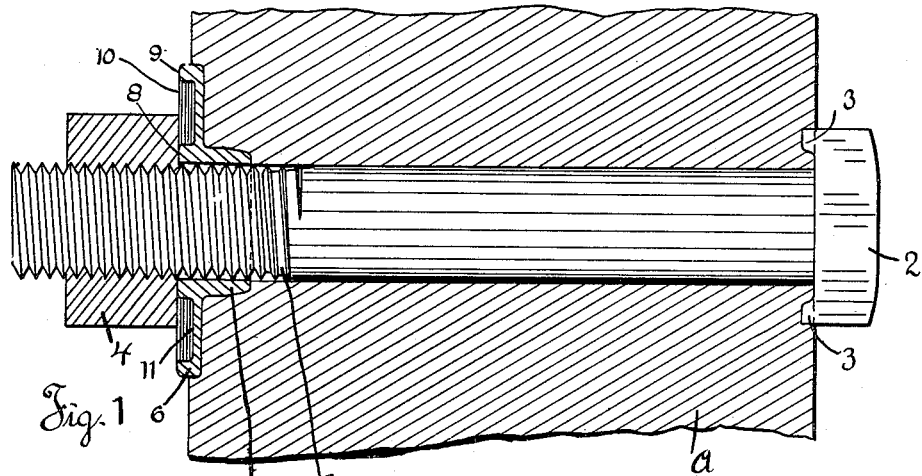
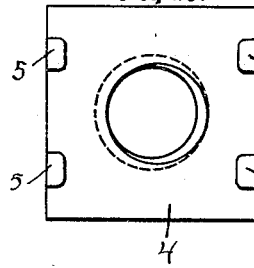
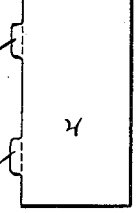
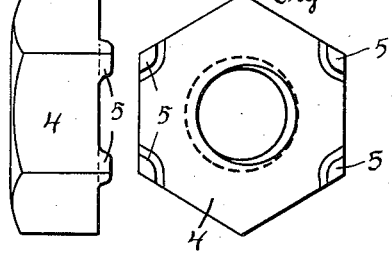
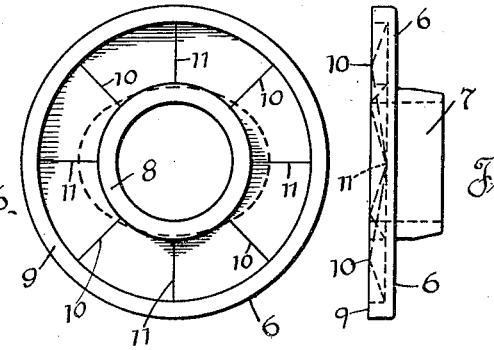
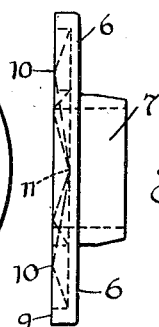
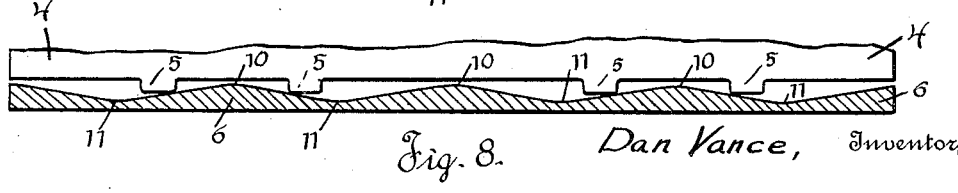
Dan Vance, Inventor,
By David O. Barnell,
Attorney.
Witnesses:

UNITED STATES PATENT OFFICE.

DAN VANCE, OF MISSOURI VALLEY, IOWA, ASSIGNOR OF NINETEEN ONE-HUNDREDTHS TO JOHN W. THOMAS, OF KANSAS CITY, KANSAS.

BOLT AND NUT RETAINING MEANS.

1,064,792.  Specification of Letters Patent.   Patented June 17, 1913.

Application filed September 18, 1911. Serial No. 650,039.

*To all whom it may concern:*

Be it known that I, DAN VANCE, a citizen of the United States, and a resident of Missouri Valley, in the county of Harrison and State of Iowa, have invented certain new and useful Improvements in Bolt and Nut Retaining Means, of which the following is a specification.

My invention relates to retaining means for bolts and nuts, and it is the object thereof to provide a simple, effective and inexpensive device for preventing loosening or unscrewing of threaded bolts and nuts when used in places where they are subjected to jarring or vibration.

Constructions embodying my invention are illustrated in the accompanying drawings, in which—

Figure 1 is a side view, partly in section, of a bolt and nut provided with my improved retaining devices, Fig. 2 is an end view of a square nut made according to my invention, Fig. 3 is a side view of the same, Fig. 4 is a side view of a hexagon nut, Fig. 5 is an end view of the same, Fig. 6 is an end view of the retaining washer, Fig. 7 is a side view of the same, and Fig. 8 is a diagrammatic plane-development of the contacting retaining portions of the nut and washer.

Referring to Fig. 1 there is shown a bolt having a threaded shaft portion 1, and a head 2 which is provided on its inner face with lugs 3 adapted to be forced into the piece of material A through which the bolt is passed, as shown, or which may engage a retaining washer of the form hereinafter described. On the threaded portion of the bolt is screwed a nut 4 which may be of any ordinary form, such as the square and hexagonal forms shown in Figs. 2 to 5. On the inner end face of the nut the same is provided with a plurality of projecting lugs 5 arranged adjoining the peripheral edge of said face. The said lugs are arranged in pairs, the distance between the lugs of each pairs, being less than that between the adjacent lugs of the different pairs. The corners of the lugs are made slightly rounding, as shown. Between the nut 4 and the piece of material A through which the bolt is passed, is disposed a washer 6, which, when the material A is of wood or the like, may be provided on its inner face with a projecting portion 7 adapted to interengage with the material A to prevent rotation of the washer. The projecting portion 7 is indicated by dotted lines in Fig. 6 as being of elliptical outline, although any other non-circular form might be used. In the outer face of the washer, and coincident radially with the lugs 5 on the nut, is an annular channel, the same being bordered at the inner side by an annular plane-surfaced portion 8 and upon the outer side by an annular plane-surfaced portion 9. The bottom of the channel is made undulating, having equidistantly spaced radially extending crests 10 and hollows 11, each equal in number to the lugs 5, there being, in the structure shown, four of each.

Referring to Fig. 8, it will be seen how the undulating surface of the washer and the lugs on the face of the nut coact to prevent relative rotation of said parts when the same are assembled. The nut is screwed tight onto the washer so that the lugs 5 engage the undulating surface forming the bottom of the annular channel therein, and each pair of the lugs either straddles one of the crests 10, as shown, or one of the depressions 11 of the undulating surface. The corners of each pair of lugs thus rest against oppositely inclined surfaces which resist turning of the nut in either direction, sufficiently to prevent loosening thereof by jarring or vibration, although in tightening up the nut with a wrench the parts will yield sufficiently to permit the nut to be forced to one of the positions described.

Now, having described my invention, what I claim and desire to secure by Letters Patent is:

1. In a device of the class described, a washer having a projecting portion on one face and means on the opposite face forming an annular channel therein, said channel having an undulating bottom surface formed with radial crests and hollows, a bolt passing through said washer, a nut screwed on the bolt adjoining said washer and having pairs of projecting lugs formed on the face adjoining the washer, the said lugs adapted to engage the undulating surface of the said washer and straddle the crests and hollows thereof, and one of the projecting portions of said washer being adapted for engagement with the inner face of the nut, when screwed thereagainst.

2. In a device of the class described, a washer having an oblong projecting portion on one face and annular projecting portions on the opposite face forming an annular channel between them, said channel having an undulating bottom surface provided with radial crests and hollows, a bolt passing through said washer, a nut adapted to be screwed on the bolt and having pairs of lugs formed on the face adjoining the said washer, the said lugs being adapted to straddle and bind against the said crests and one of the annular projecting portions of said washer adapted for engagement with the inner face of the nut.

In testimony whereof I have hereunto subscribed my name in the presence of two witnesses.

DAN VANCE.

Witnesses:
 D. O. BARNELL,
 J. E. TITUS.

Copies of this patent may be obtained for five cents each, by addressing the "Commissioner of Patents, Washington, D. C."